United States Patent
Feynman (10) Patent No.: US 9,411,712 B2
(45) Date of Patent: Aug. 9, 2016

(54) GENERATING TEST DATA

(75) Inventor: Carl Richard Feynman, Waban, MA (US)

(73) Assignee: Ab Initio Technology LLC, Lexington, MA (US)

( * ) Notice: Subject to any disclaimer, the term of this patent is extended or adjusted under 35 U.S.C. 154(b) by 428 days.

(21) Appl. No.: 12/797,509

(22) Filed: Jun. 9, 2010

(65) Prior Publication Data

US 2010/0318481 A1 Dec. 16, 2010

Related U.S. Application Data

(60) Provisional application No. 61/185,797, filed on Jun. 10, 2009.

(51) Int. Cl.
*G06F 15/00* (2006.01)
*G06F 15/18* (2006.01)
*G06F 11/36* (2006.01)

(52) U.S. Cl.
CPC .................. *G06F 11/3684* (2013.01)

(58) Field of Classification Search
CPC ................. G06F 2216/03; G06F 17/30324
USPC ....................................... 369/53.16
See application file for complete search history.

(56) References Cited

U.S. PATENT DOCUMENTS

| | | | |
|---|---|---|---|
| 5,664,187 A * | 9/1997 | Burkes et al. ................ | 711/114 |
| 6,546,389 B1 | 4/2003 | Agrawal et al. | |
| 6,567,936 B1 * | 5/2003 | Yang ................ | G06F 17/30595 707/999.002 |
| 6,581,058 B1 | 6/2003 | Fayyad et al. | |
| 6,643,648 B1 | 11/2003 | Ross et al. | |
| 6,957,161 B2 | 10/2005 | Allen et al. | |
| 7,080,063 B2 * | 7/2006 | Campos ............ | G06F 17/30601 |
| 7,194,317 B2 | 3/2007 | Kothare et al. | |
| 7,266,699 B2 | 9/2007 | Newman | |
| 7,334,466 B1 | 2/2008 | Brislin | |
| 7,849,075 B2 | 12/2010 | Gould et al. | |
| 8,117,221 B2 | 2/2012 | Elteto et al. | |
| 8,209,549 B1 | 6/2012 | Bain, III | |
| 2002/0138492 A1 | 9/2002 | Kil | |

(Continued)

FOREIGN PATENT DOCUMENTS

| CN | JP10-030943 | 2/1998 |
|---|---|---|
| CN | 1495584 | 5/2004 |

(Continued)

OTHER PUBLICATIONS

'Data sanitization techniques', A Net 2000 Ltd White Paper, Jan. 24, 2009.*

(Continued)

*Primary Examiner* — Kakali Chaki
*Assistant Examiner* — Peter Coughlan
(74) *Attorney, Agent, or Firm* — Fish & Richardson P.C.

(57) ABSTRACT

Generating test data includes: reading values occurring in at least one field of multiple records from a data source; storing profile information including statistics characterizing the values; generating a model of a probability distribution for the field based on the statistics; generating multiple test data values using the generated model such that a frequency at which a given value occurs in the test data values corresponds to a probability assigned to that given value by the model; and storing a collection of test data including the test data values in a data storage system.

30 Claims, 3 Drawing Sheets

(56) References Cited

U.S. PATENT DOCUMENTS

| | | | |
|---|---|---|---|
| 2004/0107189 A1* | 6/2004 | Burdick | G06F 17/30324 |
| 2005/0240862 A1* | 10/2005 | Palmer | 715/509 |
| 2005/0288910 A1* | 12/2005 | Schlessinger et al. | 703/2 |
| 2006/0179075 A1* | 8/2006 | Fay | 707/102 |
| 2006/0242610 A1* | 10/2006 | Aggarwal | 716/1 |
| 2007/0106666 A1* | 5/2007 | Beckerle | G06F 17/30575 |
| 2007/0199074 A1 | 8/2007 | Levine et al. | |
| 2007/0256061 A1 | 11/2007 | Victorov | |
| 2008/0118150 A1 | 5/2008 | Balakrishnan et al. | |
| 2009/0122676 A1* | 5/2009 | Tanizawa | 369/53.16 |
| 2009/0132575 A1 | 5/2009 | Kroeschel et al. | |
| 2011/0179011 A1 | 7/2011 | Cardno et al. | |
| 2012/0030165 A1 | 2/2012 | Guirguis et al. | |
| 2012/0197887 A1 | 8/2012 | Anderson | |

FOREIGN PATENT DOCUMENTS

| | | |
|---|---|---|
| DE | 19911176 | 9/2000 |
| JP | 2001-256076 | 9/2001 |
| JP | 2006-221647 | 8/2006 |
| JP | 2009-110179 | 5/2009 |
| WO | WO02/084531 | 10/2002 |
| WO | WO2008/124319 | 10/2008 |
| WO | WO 2008/124319 | 10/2008 |

OTHER PUBLICATIONS

'A novel method for protecting sensitive knowledge in association rules mining': Wang, 2005, IEEE, Annual international computer software and application conference (COMPSAC'05) 0730-3157/05.*

'A data sanitization method for privacy preserving data re-publication': Lee, IEEE, 2008, 978-0-7695-3322.*

'A framework for evaluating privacy preserving data mining algorithms': Bertino, 2005, Springer, data mining and knowledge discovery.*

Edgar, 'Data Sanitization Techniques' [retrieved on Aug. 1, 2013] Retrieved from the Internet <URL:http://www.orafaq.com/papers/data_sanitization.pdf>.*

A statistical approach to modeling Indian classical music performance: Chakraborty, Oct. 2008, Cornell University.*

'An Introduction to Programming and Problem Solving With Pascal': Schneider, 1982, John Wiley.*

'An introduction to programming and problem solving with pascal' :Schneider, 1982, Wiley.*

An introduction to programming and problem solving with pascal: Schneider, 1982, John Wiley.*

Relative frequency table and histogram:StatWMich, 2003, Retrieved from the internet http://www.stat.wmich.edu/s216/book/node11.html.*

'An Introduction to Programming and Problem Solving with Pascal': Schneider, 1982, John Wiley & Sons.*

Black, John, et al., "Ciphers with Arbitrary Finite Domains," Source Lecture Notes in Computer Science; vol. 2271 archive, Proceedings of the The Cryptographer's Track at the RSA Conference on Topics in Cryptology table of contents, 2002, pp. 114-130.

International Search Report & Written Opinion in PCT application No. PCT/US10/36812, mailed Aug. 3, 2010, 8 pages.

Luby, Michael et al., "How to construct pseudorandom permutations from pseudorandom Functions," SIAM J. Comput. vol. 17 # 2, Apr. 1988, pp. 373-386.

Maurer, Ueli, "A simplified and generalized treatment of Luby-Rackoff pseudorandom permutation generators," in 'Advances in Cryptology—EUROCRYPT '92 (Lecture Notes in Computer Science)', Berlin: Springer Verlag, vol. 658, pp. 239-255, 1992.

Parameswaran, Rupa et al., "A Robust Data-obfuscation Approach for Privacy Preservation of Clustered Data," Proceedings of the Workshop on Privacy and Security Aspects of Data Mining, pp. 18-25, 2005.

International Search Report & Written Opinion issued in PCT application No. PCT/US10/38018, mailed Aug. 23, 2010, 10 pages.

"Data Sanitization Techniques," A Net 2000 Ltd. White Paper, Jan. 24, 2009, 10 pages.

Price, Huw, "A Short guide to Scrambling, Masking and Obfuscating Production Data," Grid-Tools Ltd., Feb. 6, 2009, pp. 1-17.

Supplementary European Search Report, EP10783895, Dec. 11, 2012, 5 pages.

"Data Sanitization Techniques," A Net 2000 Ltd. White Paper, 2005, 10 pages.

Transaction History, U.S. Appl. No. 12/497,354.

Chinese Office Action, with English translation, CN application No. 2010800354097, mailed Nov. 21, 2013, 17 pages.

Japanese Office Action, with English Translation, JP application No. 2012-515111, mailed Feb. 18, 2014, 14 pages.

Kimura, Hirofumi, Easycap for Oracle: data base test data generation tool, Dr. Dobb's Journal Japan, Jan. 1, 1999, vol. 8, 1st Issue, p. 138-139.

Tanabe, Tsuneo, Easycap for Oracle Ver 1.0, Visual Basic magazine, Japan, Shoeisha, Mar. 1, 1999, vol. 5, 7th issue, p. 168-171.

Umeda, Hironori, Software Development Support Tool (System Integrator) for Oracle SI Object Browser Ver. 8.0, DB Magazine, Japan, Shoeisha, Jun. 1, 2003, vol. 13, 3rd issue, p. 241-245.

Japanese Office Action, with English Translation, JP application No. 2012-514029, mailed Mar. 27, 2014 (28 pages).

International Search Report & Written Opinion issued in PCT/US2014/070747, mailed May 29, 2015 (14 pages).

* cited by examiner

| VALUE | OCCURRENCES |
|---|---|
| 4.0 | 140 |
| 5.25 | 70 |
| 6.5 | 60 |
| 1.5 | 30 |
| 8.75 | 20 |

GENERATING TEST DATA

CROSS-REFERENCE TO RELATED APPLICATIONS

This application claims priority to U.S. Application Ser. No. 61/185,797, filed on Jun. 10, 2009, incorporated herein by reference.

BACKGROUND

This description relates to generating test data.

Some organizations have data they wish to keep confidential (e.g., production data that may include customer information). When the confidential data is to be processed by programs, it may be necessary for developers to develop such programs without having access to actual production data for security reasons. For example, one way to keep the production data confidential is to minimize the number of people who see it. However, to ensure that their applications will run correctly with production data, the programmers may need realistic test data for development and testing that exhibits certain characteristics of production data without exposing any confidential information.

SUMMARY

In one aspect, in general, a method for generating test data includes: reading values occurring in at least one field of multiple records from a data source; storing profile information including statistics characterizing the values; generating a model of a probability distribution for the field based on the statistics; generating multiple test data values using the generated model such that a frequency at which a given value occurs in the test data values corresponds to a probability assigned to that given value by the model; and storing a collection of test data including the test data values in a data storage system.

Aspects can include one or more of the following features.

The generated model includes at least a first portion of an estimate of the probability distribution that corresponds to a probability density over a continuous range of values and at least a second portion of an estimate of the probability distribution that corresponds to one or more discrete probability values for discrete values.

The statistical information includes information that indicates how many values fall in each of multiple continuous ranges of values.

The first portion is derived at least in part from information that indicates how many values fall in one of the continuous ranges of values.

The statistical information includes information that indicates how often each of multiple particular values occur in the records.

One of the discrete probability values in the second portion is derived at least in part from information that indicates how often one of the particular values occurs in the records.

The method further includes generating the multiple test data values using the generated model and additional information indicating characteristics of the values read from the data source occurring in the field.

The additional information indicates a number of invalid values occurring in the field.

The additional information indicates a fraction of distinct values occurring in the field.

The method further includes providing a development environment for developing at least one program for processing the records from the data source using the collection of test data stored in the data storage system.

The records from the data source are inaccessible to the development environment.

The method further includes he data source is inaccessible to the development environment.

In another aspect, in general, a system for generating test data includes: a data source providing records having values in one or more fields; a data storage system; and one or more processors coupled to the data storage system providing an execution environment to: read values occurring in at least one field of multiple records from the data source, store profile information including statistics characterizing the values, generate a model of a probability distribution for the field based on the statistics, generate multiple test data values using the generated model such that a frequency at which a given value occurs in the test data values corresponds to a probability assigned to that given value by the model, and store a collection of test data including the test data values in the data storage system.

In another aspect, in general, a system for generating test data includes: a data source providing records having values in one or more fields; a data storage system; and means for processing the records to generate the test data, the processing including: reading values occurring in at least one field of multiple records from the data source, storing profile information including statistics characterizing the values, generating a model of a probability distribution for the field based on the statistics, generating multiple test data values using the generated model such that a frequency at which a given value occurs in the test data values corresponds to a probability assigned to that given value by the model, and storing a collection of test data including the test data values in the data storage system.

In another aspect, in general, a computer-readable medium stores a computer program for generating test data. The computer program includes instructions for causing a computer to: read values occurring in at least one field of multiple records from a data source; store profile information including statistics characterizing the values; generate a model of a probability distribution for the field based on the statistics; generate multiple test data values using the generated model such that a frequency at which a given value occurs in the test data values corresponds to a probability assigned to that given value by the model; and store a collection of test data including the test data values in a data storage system.

Aspects can include one or more of the following advantages.

Test data can be generated randomly, but in such a way that various characteristics of an original set of production data can be replicated to provide for more realistic testing. Characteristics such as statistical properties and some actual values from the original data can be included in the test data, while ensuring that confidential information is not included in the test data. An initial profiling process enables the statistical properties and actual values to be extracted and summarized within profile information, which is then used for generating the test data. As long as no confidential information leaks into the profile information, there will be no confidential information in the test data either. The actual values represented in the profile information are the most common values in respective fields, which is unlikely to correspond to confidential information (which is typically unique to a given customer and therefore rare within the original data).

Other features and advantages of the invention will become apparent from the following description, and from the claims.

DESCRIPTION

Figure 1:
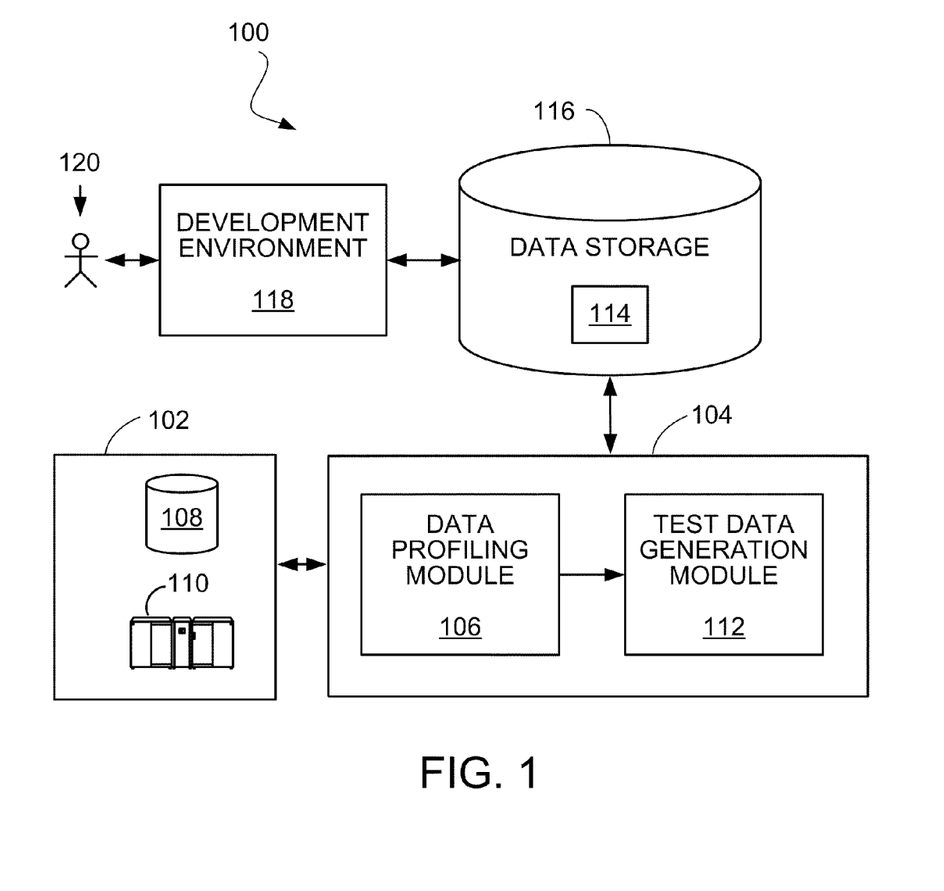
FIG. 1 is an exemplary system for using generated test data to develop programs.

Referring to FIG. 1, a system 100 for using test data to develop programs includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 for test data generation includes a data profiling module 106 and a test data generation module 112. The execution environment 104 may be hosted on one or more general-purpose computers under the control of a suitable operating system, such as the UNIX operating system. For example, the execution environment 108 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The data profiling module 106 reads data from the data source 102 and stores profile information describing various characteristics of the data values that occur in the data source 102. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104 over a local or wide area data network.

The test data generation module 112 uses the profile information generated by the data profiling module 106 to generate a collection of test data 114 stored in a data storage system 116 accessible to the execution environment 104. The data storage system 116 is also accessible to a development environment 118 in which a developer 120 is able to develop and test programs using the test data 114. However, the original production data in the data source 102 can be kept secure by keeping it inaccessible to the developer 120. The development environment 118 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference.

The data profiling module 106 can profile data from a variety of types of systems including different forms of database systems. The data may be organized as records having values for respective fields (also called "attributes" or "columns"), including possibly null values. The profile information can be organized to provide separate profiles for different fields, called "field profiles" describing values that occur in those fields. When first reading data from a data source, the data profiling module 106 typically starts with some initial format information about records in that data source. (Note that in some circumstances, even the record structure of the data source may not be known initially and may instead be determined after analysis of the data source). The initial information about records can include the number of bits that represent a distinct value, the order of fields within a record, and the type of value (e.g., string, signed/unsigned integer) represented by the bits. As the data profiling module 106 reads records from a data source, it computes statistics and other descriptive information that reflect the values in a given field. The data profiling module 106 then stores those statistics and descriptive information in the form of field profiles for access by the test data generation module 112. The statistics in the field profile for a given field can include, for example, a histogram of values in that field, maximum, minimum, and mean values occurring in that field, and samples of the least common and most common values occurring in that field. The profile information can also include information associated with multiple fields of the records in the data source 102 such as total number of records, and total number of valid or invalid records. For example, one description of a process for profiling fields of a data source is described in U.S. Publication No. 2005/0114369, entitled "Data Profiling," incorporated herein by reference.

Figure 2:
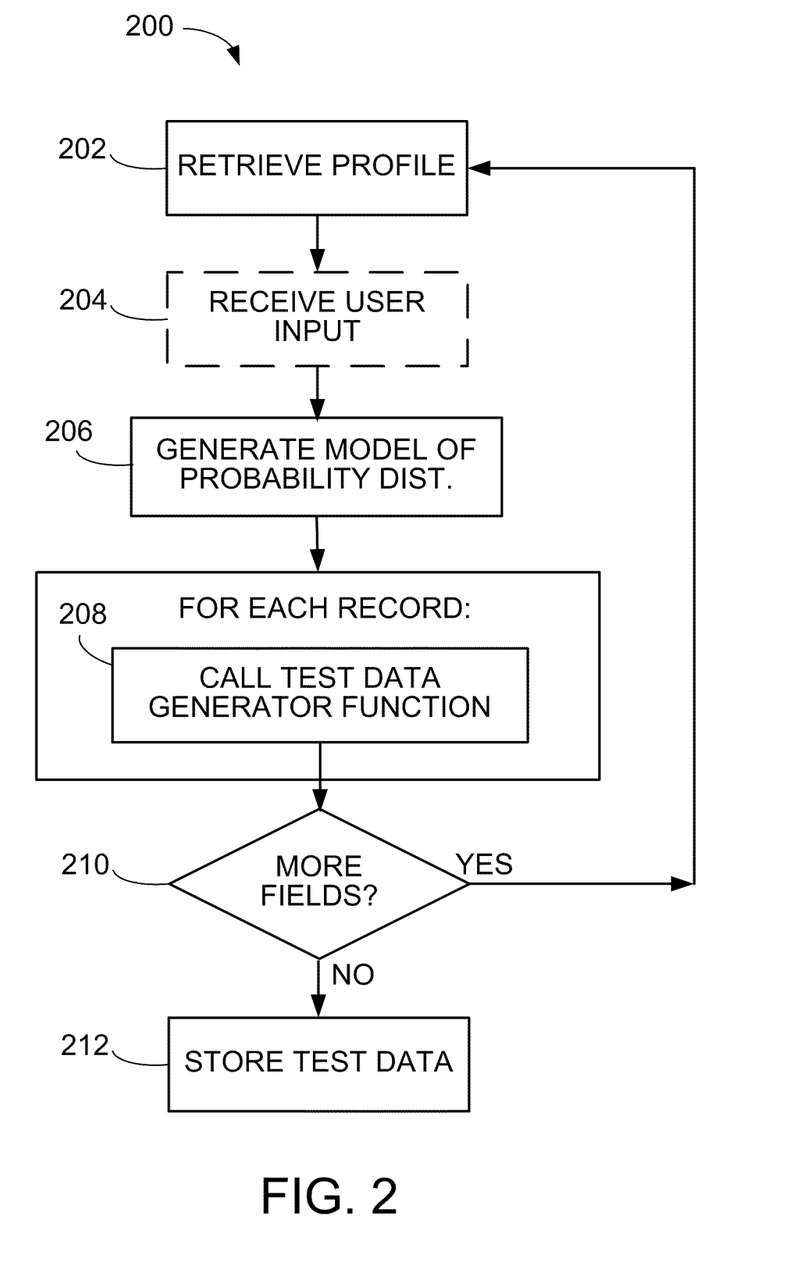
FIG. 2 is a flowchart for an exemplary test data generation process.

FIG. 2 shows a flowchart of an exemplary test data generation process 200. The test data generation module 112 retrieves (202) a stored field profile for a first field for which test data is to be generated. In some implementations, additional information that can be derived from information in the field profile can be computed and stored after the field profile is loaded. Optionally, the module 112 receives (204) user input about characteristics that the generated test data values should have (e.g., information indicating the number of distinct values that should be present in the test data values, as described in more detail below). The module 112 generates (206) a model of a probability distribution for the field based on statistics in the retrieved field profile for the field. The model includes estimates of probabilities for a range of values that are allowed to occur in the field, as described below with reference to the example of FIG. 3.

The module 112 calls (208) a test data generator function once for each test data value to be generated. The test data generator function takes as input arguments the model of the probability distribution and optional arguments "index" and "limit," as described in more detail below. The test data generator function provides a test data value as output according to the model provided as input and other characteristics described below. In some cases, the number of test data values to be generated for a given field can be selected to match the total number of records in the profiled dataset from the original data source, which is contained in the profile information. In some cases, the user may want to generate a particular number of values, which can be provided by the user directly (e.g., in step 204). The values output from the function are inserted into the appropriate field of the records to be provided as the collection of test data 114. The module 112 determines (210) whether additional fields are to be processed and if so performs another iteration of test data generation. The module 112 stores (212) the generated collection of test data 114 in the data storage system 116.

In some implementations, the number of test data values to be generated for a given field is determined implicitly by calling the test data generator function once for each record received in a stream of input records. For example, when development environment 118 supports development and execution of applications as dataflow graphs, the execution environment 104 may also implement the data profiling module 106 and the test data generation module 112 as dataflow graphs themselves. In some implementations, the data profiling module would read the production data from the data source 102 as a stream of N individual records and would provide the records to the module 112 as a stream of N individual records. The module 112 would be able to replace values in each field of the original records with the generated test data values for those fields. The module 112 can perform a separate iteration of processing the stream of N records for each of M fields, generating N test data values in each of M iterations. The test data values for different iterations can be generated sequentially one after another, or in parallel at the same time. In some implementations, certain properties of the original values being replaced can be preserved in the generated test data values (such as functional dependencies between fields such as State and Zip code, for example). Also, in some implementations, a subset of the fields of the original records can be selected for replacement with test data values generated according to the respective models, and the remaining fields can keep their original values or be processed according to a different technique, such as being replaced with constant values or pseudorandom values generated according to a uniform probability distribution.

The test data generator function returns a test data value of a particular data type (e.g., string, decimal, date, or a date-time type that includes both the date and the time), where the data type is determined based on the field profile for a given field. The test data values are collected as values of the given field within records in the collection of test data 114. The test data values are generated at least in part based on a random selection (e.g., using a pseudorandom number generation techniques) using the model, such that the frequency at which a given value occurs in the test data 114 corresponds to the probability assigned to that value by the model provided as input to the test data generator function. The test data generator function generates test data values such that the data profiling module 106 processing the collection of test data 114 would yield profile information similar to the profile information used to generate the collection of test data 114.

Figure 3A:
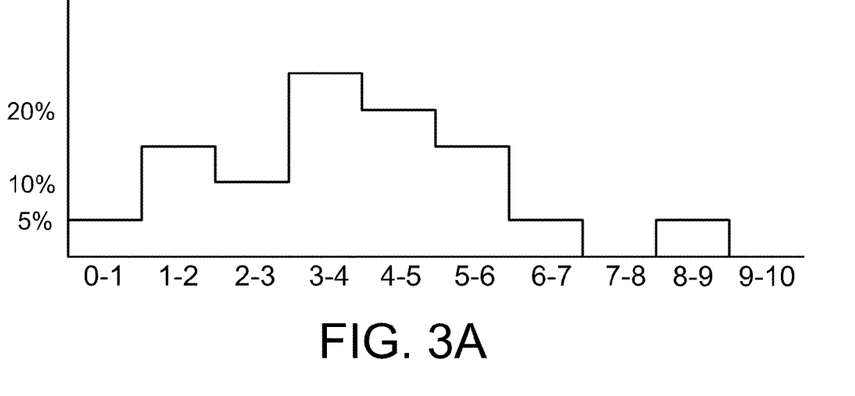
FIGS. 3A-3B are examples of statistical information.
Figure 3B:
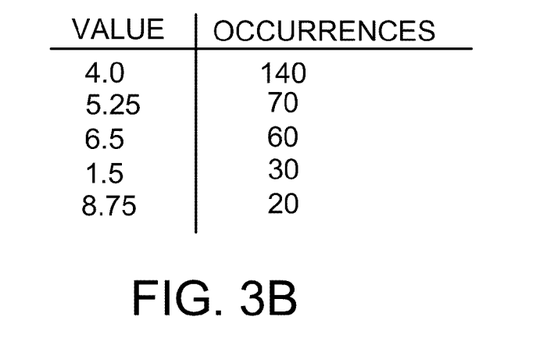
Figure 3C:
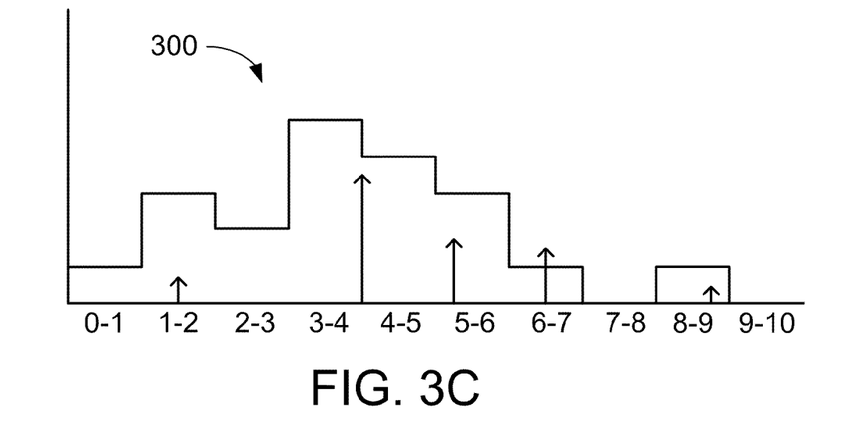
FIG. 3C is an example of a model of a probability distribution.

FIGS. 3A and 3B show exemplary statistical information in a field profile, and FIG. 3C shows an exemplary model 300 of a probability distribution for a field. The test data values in this example are selected from a range of possible values that have a defined order among them (e.g., numbers ordered by numerical value, or strings ordered by a defined alphabetical ordering). The statistical in this example includes a plot (FIG. 3A) of deciles indicating what fraction of the values fall within each of 10 deciles between the minimum and maximum values of the range (real numbers between 0 and 10 in this example). The horizontal axis of the plot shown in FIG. 3A is labeled to show the range of values (0-1, 1-2, etc.) corresponding to each decile. In other examples, the horizontal axis would cover the range of values corresponding to whatever field is being modeled. Any domain of potential values, including strings, can be mapped to a numerical range (e.g., by interpreting the characters in a string as numbers in the appropriate base) of such a plot. The statistical information also includes a list (FIG. 3B) of frequent values, which in this example includes the top five most frequent values and the number of occurrences of each value. The model 300 of the probability distribution for this field takes into account both the continuous information provided by the deciles plot and the discrete information provided by the frequent values list.

For example, the model 300 includes a continuous probability density for values within each continuous decile range that are proportional to the fractions given by the deciles plot, and discrete probabilities for the values in the frequent values list that correspond to discrete probabilities (e.g., delta functions) at those discrete values that are proportional to the number of occurrences in the list. The heights of the continuous parts of the probability distribution relative to the heights of the delta functions depend on the number of values in the original data represented by the deciles. The heights of the continuous parts of the probability distribution are lowered relative to the heights of the deciles by subtracting the total number of occurrences represented by any values in the frequent values list that fall within each decile (so that those frequent values are not counted twice). If a frequent value falls on the border between deciles (e.g., the value 4.0 in FIG. 3C), the number of occurrences of that value is subtracted from the decile that included that value. For example, the number of occurrences of that value are subtracted from the decile to the left in an implementation in which values are assigned to deciles based on an equal-to-or-less-than test. The absolute value of the probabilities are determined such that the integral of the distribution is unity (i.e., the sum of all probabilities is equal to one). Other types of statistical information can be used to derive the model, such as histograms of values appearing in a field of the profiled data. Statistical information that indicates how many values fall in a certain range leads to continuous portions of the model, and statistical information that indicates how often a particular value occurs leads to discrete portions of the model (e.g., delta functions).

By matching the model to the probability distribution of the profiled data, characteristics of the generated test data determined by the probability distribution such as mean, standard deviation, common values (e.g., values at the delta functions in the model), and maximum and minimum allowable values are automatically matched to those characteristics of the profiled data.

In addition to characteristics that are determined by the probability distribution, the test data generator function is able to take into account additional characteristics to achieve a closer match to the profile information for the field. The following are some exemplary characteristics that the test data generator function is able to take into account when performing the random selection based on the provided model.

fraction of invalid values: the test data generator function is able to generate invalid values in the field at approximately the same fraction as in the profiled data. In some cases, the field profile may include a list of common invalid values from which to choose. In some cases, if the field profile includes a validity specification of what constitutes a valid value for the field, the test data generator function is able to select an invalid value that violates that specification. Alternatively, if no sample invalid values or validity specification exists, the function can select a value that is invalid with respect to a data type for the field (e.g., letters in a decimal or improperly formatted dates).

fraction of distinct values: the test data generator function is able to generate distinct values in the field at approximately the same fraction (i.e., number of distinct values/ total number of values) as in the profiled data. To do this, the function receives as input the optional "index" and "limit" arguments. The index argument is a non-negative integer that is different for each call of the function (e.g., an integer that increments for each record), and the limit argument is equal to or larger than any value that has been or will be provided as the index argument. The limit argument can be determined once at the beginning of generating test data values for a field, and can be provided based on user input (e.g., step 204). For example, the value of the limit argument can be set to the number of records a user is going to request, which may be known in advance by the user, but would not be known in advance by the processor (or processors) running the test data generator function.

maximum and minimum length: the test data generator function is able to generate values with the same maximum and minimum lengths as in the profiled data. For example, for strings the length corresponds to the number of characters, and for numbers the length can be defined the number of digits, including digits after a decimal place.

observed characters: the test data generator function is able to generate values, such as strings, composed of only the characters that appear in the profiled data (as indicated in the field profile).

One example of a technique that can be used for the test data generator function to determine output test data values, for a given value of the limit argument L, as the index argument I goes from 0 to L-1 involves generating a pseudorandom permutation of the all of the values of I from 0 to L-1 and scaling these values so that they fall in the range of 0 to 1 (e.g., dividing by L). In this way, each input value of I can be mapped to a different range of numbers that define a corresponding portion of the modeled probability distribution. For example, for L=10, the 10 index values from 0 to 9 are mapped pseudorandomly using the permutation to 10 different ranges between 0 and 1:0 to 0.1, 0.1 to 0.2, etc. The probability distribution is sliced into a corresponding number of slices (in this example 10 slices) of equal probability, and an output value somewhere within a selected slice is chosen as the output test data value. The function takes into account the number of unique values to be output by reducing the number of slices accordingly and outputting values within different slices more than once. For example, if there are half as many unique values as total values, then each value is output twice. Any of a variety of techniques can be used to generate the permutation (e.g., techniques based on a Luby-Rackoff type of algorithm described in "A simplified and generalized treatment of Luby-Rackoff pseudorandom permutation generators" by Ueli Maurer, in "Advances in Cryptology-EUROCRYPT '92 (Lecture Notes in Computer Science)," Berlin: Springer Verlag, vol 658, pp 239-255, 1992, incorporated herein by reference).

The test data generation approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for generating test data for at least one particular field of a record format describing two or more fields, the method performed by one or more computer systems and including:

reading values occurring in a field of multiple records from a first dataset, the records each including multiple fields, the field from which the values are read corresponding to the at least one particular field for which the test data is to be generated, and the records each including the field corresponding to the at least one particular field for which the test data is to be generated;

storing profile information for the at least one particular field, the profile information including a list identifying, for two or more of the values read from the field in the multiple records, information about the frequency at which each of the two or more values read from the field in the multiple records occurs in the field in the multiple records;

generating a model of a probability distribution for the at least one particular field, based on the list;

based on the model of the probability distribution, generating a second dataset including multiple test data values for the at least one particular field such that a frequency at which a given value read from the field in the multiple records occurs in the test data values in the second dataset corresponds to a probability assigned to that given value in the first dataset by the model; and storing the test data including the test data values in a data storage system.

2. The method of claim 1, wherein the generated model includes at least a first portion of an estimate of the probability distribution that corresponds to a probability density over a continuous range of values and at least a second portion of an estimate of the probability distribution that corresponds to one or more discrete probability values for discrete values.

3. The method of claim 1, wherein the statistical information includes information that indicates how many values fall in each of multiple continuous ranges of values.

4. The method of claim 3, wherein the first portion is derived at least in part from information that indicates how many values fall in one of the continuous ranges of values.

5. The method of claim 1, wherein the statistical information includes information that indicates how often each of multiple particular values occur in the records.

6. The method of claim 5, wherein one of the discrete probability values in the second portion is derived at least in part from information that indicates how often one of the particular values occurs in the records.

7. The method of claim 1, further including generating the multiple test data values using the generated model and additional information indicating characteristics of the values read from the first dataset occurring in the at least one particular field.

8. The method of claim 7, wherein the additional information indicates a number of invalid values occurring in the at least one particular field.

9. The method of claim 7, wherein the additional information indicates a fraction of distinct values occurring in the at least one particular field.

10. The method of claim 1, further including providing a development environment for developing at least one program for processing the records from the first dataset using the collection of test data stored in the data storage system.

11. The method of claim 10, wherein the records from the first dataset are inaccessible to the development environment.

12. The method of claim 11, wherein the first dataset is inaccessible to the development environment.

13. A system for generating test data for at least one particular field of a record format describing two or more fields, the system including:
   a data source providing a first dataset with records having values in one or more fields;
   a data storage system; and
   one or more processors coupled to the data storage system providing an execution environment to:
      read values occurring in a field of multiple records from a first dataset, the records each including multiple fields, the field from which the values are read corresponding to the at least one particular field for which the test data is to be generated, and the records each including the field corresponding to the at least one particular field for which the test data is to be generated;
      store profile information for the at least one particular field, the profile information including a list identifying, for two or more of the values read from the field in the multiple records, information about the frequency at which each of the two or more values read from the field in the multiple records occurs in the field in the multiple records;
      generate a model of a probability distribution for the at least one particular field, based on the list;
      based on the model of the probability distribution, generate a second dataset including multiple test data values for the at least one particular field such that a frequency at which a given value read from the field in the multiple records occurs in the test data values in the second dataset corresponds to a probability assigned to that given value in the first dataset by the model; and
      store the test data including the test data values in a data storage system.

14. The system of claim 13, wherein the generated model includes at least a first portion of an estimate of the probability distribution that corresponds to a probability density over a continuous range of values and at least a second portion of an estimate of the probability distribution that corresponds to one or more discrete probability values for discrete values.

15. The system of claim 13, wherein the statistical information includes information that indicates how many values fall in each of multiple continuous ranges of values.

16. The system of claim 13, wherein the statistical information includes information that indicates how often each of multiple particular values occur in the records.

17. The system of claim 13, wherein the one or more processors coupled to the data storage system further provide an execution environment to: generate the multiple test data values using the generated model and additional information indicating characteristics of the values read from the first dataset occurring in the at least one particular field.

18. The system of claim 13, wherein the execution environment further provides a development environment for developing at least one program for processing the records from the first dataset using the collection of test data stored in the data storage system.

19. The system of claim 13, wherein the processing further includes: providing a development environment for developing at least one program for processing the records from the first dataset using the collection of test data stored in the data storage system.

20. A system for generating test data for at least one particular field of a record format describing two or more fields, the system including:
   a data source providing a first dataset with records having values in one or more fields;
   a data storage system; and
   means for processing the records to generate the test data, the processing including:
      reading values occurring in a field of multiple records from a first dataset, the records each including multiple fields, the field from which the values are read corresponding to the at least one particular field for which the test data is to be generated, and the records each including the field corresponding to the at least one particular field for which the test data is to be generated;
      storing profile information for the at least one particular field, the profile information including a list identifying, for two or more of the values read from the field in the multiple records, information about the frequency at which each of the two or more values read from the field in the multiple records occurs in the field in the multiple records;
      generating a model of a probability distribution for the at least one particular field, based on the list;
      based on the model of the probability distribution, generating a second dataset including multiple test data values for the at least one particular field such that a frequency at which a given value read from the field in the multiple records occurs in the test data values in the second dataset corresponds to a probability assigned to that given value in the first dataset by the model; and storing the test data including the test data values in a data storage system.

21. The system of claim 20, wherein the generated model includes at least a first portion of an estimate of the probability distribution that corresponds to a probability density over a continuous range of values and at least a second portion of an estimate of the probability distribution that corresponds to one or more discrete probability values for discrete values.

22. The system of claim 20, wherein the statistical information includes information that indicates how many values fall in each of multiple continuous ranges of values.

23. The system of claim 20, wherein the statistical information includes information that indicates how often each of multiple particular values occur in the records.

24. The system of claim 20, wherein the processing further includes providing an execution environment to: generate the multiple test data values using the generated model and additional information indicating characteristics of the values read from the first dataset occurring in the at least one particular field.

25. A non-transitory computer-readable medium storing a computer program for generating test data for at least one particular field of a record format describing two or more fields, the computer program including instructions for causing a computer to:

read values occurring in a field of multiple records from a first dataset, the records each including multiple fields, the field from which the values are read corresponding to the at least one particular field for which the test data is to be generated, and the records each including the field corresponding to the at least one particular field for which the test data is to be generated;

store profile information for the at least one particular field, the profile information including a list identifying, for two or more of the values read from the field in the multiple records, information about the frequency at which each of the two or more values read from the field in the multiple records occurs in the field in the multiple records;

generate a model of a probability distribution for the at least one particular field, based on the list;

based on the model of the probability distribution, generate a second dataset including multiple test data values for the at least one particular field such that a frequency at which a given value read from the field in the multiple records occurs in the test data values in the second dataset corresponds to a probability assigned to that given value in the first dataset by the model; and store the test data including the test data values in a data storage system.

26. The non-transitory computer-readable medium of claim 25, wherein the generated model includes at least a first portion of an estimate of the probability distribution that corresponds to a probability density over a continuous range of values and at least a second portion of an estimate of the probability distribution that corresponds to one or more discrete probability values for discrete values.

27. The non-transitory computer-readable medium of claim 25, wherein the statistical information includes information that indicates how many values fall in each of multiple continuous ranges of values.

28. The non-transitory computer-readable medium of claim 25, wherein the statistical information includes information that indicates how often each of multiple particular values occur in the records.

29. The non-transitory computer-readable medium of claim 25, wherein the computer program further includes instructions for causing the computer to provide an execution environment to: generate the multiple test data values using the generated model and additional information indicating characteristics of the values read from the first dataset occurring in the at least one particular field.

30. The non-transitory computer-readable medium of claim 25, wherein the computer program further includes instructions for causing the computer to provide a development environment for developing at least one program for processing the records from the first dataset using the collection of test data stored in the data storage system.

* * * * *